Patented Aug. 4, 1936

2,049,582

UNITED STATES PATENT OFFICE 2,049,582

AMIDINES

Karl Ziegler, Heidelberg, Germany, assignor to Röhm & Haas Company, Philadelphia, Pa., a corporation of Delaware No Drawing. Application November 3, 1932, Serial No. 641,125. In Germany November 4, 1931

5 Claims. (Cl. 260—127)

My invention refers to substitution products of acid amidines and to the products obtainable by conversion of these amidines. It has particular reference to means whereby such products can be obtained in a particularly simple and efficient manner.

Hitherto, acid amidines have been produced mostly by treating the imidoethers or imidochlorides of carboxylic acids with ammonia or amines. As a rule a direct combination of ammonia, primary or secondary amines with nitrils cannot easily be effected. E. F. Cornell (Journ. Am. Chem. Soc., 50, p. 3311) by acting with alkali amides in liquid ammonia on nitrils produced alkali compounds of the amidines and subsequently the amidines themselves. The use of liquefied ammonia cannot be recommended in processes for producing amidines since it renders necessary the operation in apparatus cooled down to low temperatures or arranged for high pressures. Nevertheless the use of liquid ammonia as a medium, in which the reaction could take place appeared imperative since, as is well known, in the case of aceto- and propionitrils the action of sodium amide, if non-liquid ammonia is present, results in an altogether different reaction, the nitrils being dimerized or trimerized in a complicated manner by the alkali amides. In contradistinction thereto, if liquid ammonia is present, sodium acetoamidine and sodium propioamidine are obtained without any difficulty.

In view of this difference of action of the alkali amides on aceto- and propionitrils in the presence or absence of liquid ammonia it was astonishing to discover that higher aliphatic nitrils with at least four carbon atoms, including the nitrils of secondary and tertiary acids, as well as the nitrils of aromatic and heterocyclic acids, will combine with alkali amides or their organic derivatives of the type R—NH—M (wherein R is alkyl, aryl, aralkyl or a heterocyclic radicle, while M is Li, Na, K or Mg), in the absence of liquid ammonia, alkali compounds of the amidines being formed, substantially according to the equation

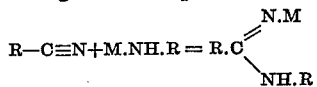

(wherein R may be H, alkyl, aryl, aralkyl or a heterocyclic radicle).

According to the present invention to the nitrils, which may be undiluted or mixed with inert solvents, may gradually be added the finely powdered amides. Alternatively the amides may be suspended or dissolved in inert solvents. Sodium amide suspensions may be used with particular advantage. Care should be taken to avoid overstepping certain limits of temperature above which the amidines will be decomposed under the influence of alkali amides, substantially in accordance with the equation

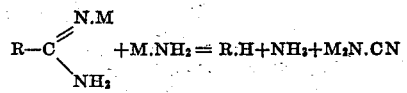

as has been observed by Fulton and Bergstrom (Journ. Amer. Chem. Soc., 53 (1931), p. 3092) when passing the nitrils through molten potassium amide. In many cases this decomposition will take place rather vigorously at 150° C., so that it is recommendable to operate at about 100° C., better still at a lower temperature.

The alkali compounds of the acid amidines, which are obtained in this manner, are colorless crystalline substances, which mostly dissolve only with difficulty in organic solvents. They can readily be converted into the amidines themselves, for instance by acting thereon with water. They may, however, also be used directly after production for all kinds of synthetic and conversion processes. By interaction with alkylating agents amidines, alkylated at the nitrogen atom are obtained. With acid chlorides acylated amidines can be produced. By means of poly halogen compounds two or more amidine radicles can be linked to each other by carbon containing members. This will be the case for instance when acting with 1.5 dibromopentane or 1.6 dibromohexane or 1.10 diiododecane on the products of the combination of sodium amide on the one hand and diethyl or triethyl acetic acid nitril or benzoic acid nitril on the other side.

Some of these reactions are indicated in the following formulæ.

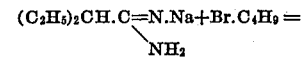
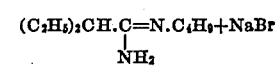
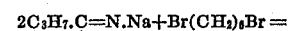
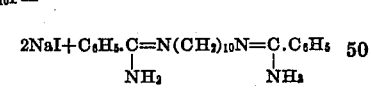

I have further found that the metal substitution products of the amidines which are derived from allyl-substituted acetic acids, can be converted by heating into (probably cyclic) isomers which possess one double linkage less than the starting substances. By means of water substances can be separated from these conversion products, which altogether behave like amidines and which must be considered to be cyclic amidines with heterocyclic pentagon or hexagon nuclei (pyrrolidonimides or piperidonimides).

These isomerizations can be expressed by the following equations:—

$$\begin{array}{c} CH\!-\!\!-\!CH_2\!-\!\!\overset{R}{\underset{|}{C}}\!\!\overset{R}{\phantom{|}} \\ \underset{CH_3}{\|} \quad HN\!-\!\!\!\underset{H}{\overset{|}{C}}\!=\!NH \end{array} = \begin{array}{c} CH_2\!-\!\!\overset{R}{\underset{|}{C}}\!\!\overset{R}{\phantom{|}} \\ H_3C\!-\!CH\!-\!\!\underset{H}{\overset{|}{N}}\!-\!\!\overset{|}{C}\!=\!NH \end{array}$$

$$\begin{array}{c} CH\!-\!\!-\!CH_2\!-\!\overset{R}{\underset{|}{C}}\!\!\overset{R}{\phantom{|}} \\ \underset{CH_3}{\|} \quad HN\!-\!\!\underset{H}{\overset{|}{C}}\!=\!NH \end{array} = \begin{array}{c} CH_2\!-\!CH_2\!-\!\overset{R}{\underset{|}{C}}\!\!\overset{R}{\phantom{|}} \\ CH_2\!-\!\underset{H}{\overset{|}{N}}\!-\!\overset{|}{C}\!=\!NH \end{array}$$

wherein R is hydrogen or alkyl. Thus in the case where the reaction starts from an allyl-substituted acetonitril, it altogether depends on the period of action of the metal amide whether, all other conditions being equal, the metal derivative of the unsaturated amidine or the metal derivative of the cyclic amidine is formed. Since the cyclic substances are capable of the most varied reactions, a great number of synthetic reactions can be obtained.

The amidines and other conversion products of the amidine metal compounds, which are obtainable according to the present invention, are adapted for use as intermediate products and as pharmaceutical products, more especially as antidiabetics.

In practising my invention I may for instance proceed as follows:—

Example 1

To 69 parts by weight isobutyric acid nitril are gradually added 39 parts finely powdered sodium amide. The very vigorous reaction is modified by cooling and the mixture which gradually becomes thicker and thicker is well mixed through by kneading and grinding. One thus obtains the sodium compound of isobutyramidine having the form of an almost colorless solid mass. This mass is carefully introduced into water, which is now extracted repeatedly with ether, whereupon the ether is extracted by shaking with hydrochloric acid for the recovery of the amidine. After evaporation the isobutyramidine hydrochloride $$(CH_3)_2CH-C\!\!\begin{array}{c}\nearrow NH \\ \searrow NH_2\end{array}\!\!-HCl$$

crystallizes out as a hygroscopic mass, which shows the properties previously described.

If desired, a surplus of nitril may be used, which serves as a diluent.

Example 2

98 parts diethyl acetonitril are dissolved in 200 parts dry benzene and the solution heated to boiling point. Now 39 parts sodium amide, which are suspended in 200 parts dry benzene, are gradually introduced, whereupon the mixture starts boiling and there results a turbid fine suspension of the sodium diethyl acetamidine in benzene.

From this solution I obtain (a) By decomposition with water removal of the benzene by distillation and fractionation in vacuo, the diethyl acetamidine, being a colorless strongly basic thick oil boiling under 13 mms. at 105° C. The yield is at least 100 parts=80% of the calculated amount. Its formula is $$(C_2H_5)_2CH-C\!\!\begin{array}{c}\nearrow NH \\ \searrow NH_2\end{array}$$

(b) By acting thereon with allylbromide at the boiling temperature of benzene and subsequently treating as above with water and fractionating, the diethyl acetallylamidine $$((C_2H_5)_2CH.\underset{\underset{NH_2}{|}}{C}=N.CH_2.CH=CH_2)$$

a similar oil boiling under 13 mms. pressure at 116° C. The yield is 120 to 140 parts=80 to 90% of the calculated amount. The platinum hydrochloride of this base is decomposed at 229°.

(c) By acting thereon with n-butylbromide under the same conditions of operation the diethylacetbutylamidine $$(C_2H_5)_2CH-\underset{\underset{NH_2}{|}}{C}=N-CH_2CH_2CH_2CH_3$$

boiling under a pressure of 0.04 to 0.06 mm. and 105°. The platinum hydrochloride of this base is decomposed at 193 to 194°.

(d) By several hours boiling with 1.5-dibromopentane etc., the diamidine $$(C_2H_5)_2CH-\underset{\underset{NH_2}{|}}{C}=N-(CH_2)_5-N=\underset{\underset{NH_2}{|}}{C}-CH(C_2H_5)_2$$

On distillation of this compound in a high vacuum of 0.05 to 0.1 mm. there first results a distillate which probably consists of the amidine $$(C_2H_5)_2CH.\underset{\underset{\underset{H}{|}}{N}}{\overset{\|}{C}}.N\!\!\begin{array}{c}\nearrow CH_2-CH_2 \searrow \\ \searrow CH_2-CH_2 \nearrow\end{array}\!\!CH_2$$

and thereafter at 170 to 180° the diamidine itself. The distillate, which has at first the character of a highly viscous resin, solidifies for the greater part after standing. By trituration with absolute ether, colorless crystals, melting at 98° are obtained. Neutralization of the base in watery solution with hydrochloric acid and evaporation leads to the hydrochloride, which is decomposed at 278°, the analysis of this salt showed 19.2% Cl as against 19.4% Cl as calculated. It shows a marked hypoglycemic effect.

Example 3

To one part by volume lithium phenyl solution in ether, produced according to the process disclosed in the German patent specification 512,882, is added under stirring 0.1 part by weight carefully dried hexahydroaniline. Under development of heat there is formed lithium cyclohexylamide, which remains suspended in the ether. One now adds 0.1 part by weight diethyl acetonitril and boils about one half hour. The mixture is poured into hydrochloric acid in excess. There results a precipitate, being the diethyl acet cyclohexylamidine hydrochloride, which forms colorless crystals. When separated from the solution and heated with caustic soda solution it is converted into a free base $$(C_2H_5)_2CH.\underset{\underset{NH.C_6H_{11}}{|}}{C}=NH$$

which dissolves in water only with difficulty, can be recrystallized from petroleum ether and melts at 119° C.

Instead of the lithium phenyl solution any magnesium halide compound according to Grignard can be used. At the beginning of the test the cyclohexylamine may also be converted into sodium cyclohexylamide by heating with sodium hydride.

Example 4

93 parts aniline are heated with 3.9 parts finely powdered sodium amide until the development of ammonia has ceased and the aniline sodium has formed completely. Now 33.5 parts α,α-dibenzyl propionitril are added and the solution is heated 1½ hours to 100° C., whereupon the aniline in excess is driven over by means of steam. The residue is taken up with ether and the solution extracted with hydrochloric acid. On addition of an alkali to this solution there is precipitated the amidine

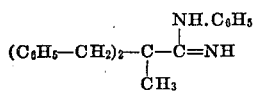

which can be obtained after recrystallization from a mixture of benzene and benzine in the form of colorless crystals melting at 131° C.

Example 5

13.7 parts diethyl allylacetonitril are allowed to drip into a boiling suspension of 3.9 parts sodium amide in about 20 parts benzene. Provided that the suspension is sufficiently fine, a very vigorous reaction sets in. The character of the reaction product depends on the length of time during which heating is continued. After this first reaction boiling further for 5 minutes, decomposition with water, drying above KOH and distillation of the benzene, results in the formation of the diethyl allylacetamidine

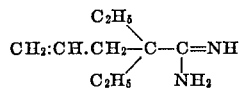

which boils under 11 mms. pressure at 132° C. and melts at 31° C. On the other hand, if, after the spontaneous reaction has come to an end, boiling is continued one hour, and the reaction mass treated as before described, there is obtained a substance boiling under 11 mms. pressure at 129 to 130° C. and melting at 110 to 113° C., which has the typical character of an amidine, is an isomer of the body melting at 31° C. and which, since the solutions of its salts are unaffected by bromine water, probably represents the cyclic saturated amidine

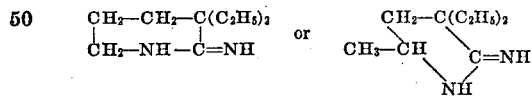

The two isomers were characterized by their platinum hydrochlorides. The salt of the substance melting at 31° C. melts at 182° C., the salt of the substance melting at 110 to 113° C. at 235° C. While the calculation showed Pt=27% there were found 26.8% for the compound melting at 100 to 113° and 27.1% for the compound melting at 235° C.

In a similar manner the nitrils of the allylacetic acid, diallyl and triallyl acetic acid, allylethyl and diallylethyl acetic acids can be converted into isomeric cyclic amidines.

In an analogous manner the amidines and alkylated amidines of benzoic acid and other aromatic acids, of cinchoninic acid and other heterocyclic acids can be obtained.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The step in the process of preparing acid amidines which comprises reacting upon an aliphatic nitrile containing at least four carbon atoms with an amide of an alkali metal in the absence of liquid ammonia at a temperature below the decomposition temperature of the metal amidine which is formed.

2. The process of preparing amidines which comprises condensing a nitrile containing at least four carbon atoms with an amide of an alkali metal in the absence of liquid ammonia and subsequently hydrolyzing the reaction mixture.

3. The process of preparing amidines which comprises condensing a nitrile containing at least four carbon atoms with sodium amide in the absence of liquid ammonia and subsequently hydrolyzing the reaction mixture.

4. In the process of preparing amidines the step which comprises treating a fatty acid nitrile having more than four carbon atoms with a compound of the formula R—NH—M wherein M is a metal radicle of the group consisting of lithium, sodium, potassium and magnesium and R is alkyl, aryl, aralkyl, or hydrogen in the absence of liquid ammonia.

5. The process of preparing amidines which comprises condensing a nitrile of an aliphatic monobasic acid containing at least four carbon atoms with an amide of an alkali metal in the absence of liquid ammonia and hydrolyzing the product.

KARL ZIEGLER.